(12) United States Patent
Sonehara et al.

(10) Patent No.: US 6,201,584 B1
(45) Date of Patent: Mar. 13, 2001

(54) LIQUID-CRYSTAL DISPLAY DEVICE

(75) Inventors: Tomio Sonehara; Tetsuhiko Takeuchi; Hidehito Iisaka, all of Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 08/983,500

(22) PCT Filed: May 20, 1997

(86) PCT No.: PCT/JP97/01695

§ 371 Date: Jun. 15, 1998

§ 102(e) Date: Jun. 15, 1998

(87) PCT Pub. No.: WO97/44706

PCT Pub. Date: Nov. 27, 1997

(30) Foreign Application Priority Data

May 22, 1996 (JP) .................................................. 8-127545

(51) Int. Cl.[7] .......................... G02F 1/1343; G02F 1/136; G09G 3/20
(52) U.S. Cl. .............................. 349/38; 349/51; 349/139; 345/55
(58) Field of Search ................................ 349/38, 51, 139; 257/532; 345/55

(56) References Cited

U.S. PATENT DOCUMENTS

| | | | | |
|---|---|---|---|---|
| 4,787,712 | * | 11/1988 | Ukai et al. | 350/333 |
| 5,650,636 | * | 7/1997 | Takemura et al. | 257/59 |
| 5,844,538 | * | 12/1998 | Shiraki et al. | 345/98 |

* cited by examiner

*Primary Examiner*—William L. Sikes
*Assistant Examiner*—Tarifur R. Chowdhury
(74) *Attorney, Agent, or Firm*—Harnes, Dickey & Pierce, P.L.C.

(57) ABSTRACT

There is provided a novel structure in which in a liquid-crystal display device including active devices a sufficient writing operation is ensured and a decrease in voltage applied to liquid crystal is prevented by a method different from a method for improving the device characteristics of active devices such as MIM devices. MIM devices 13 are connected to scanning lines 11, and pixel electrodes 15 are connected to the MIM devices 13. One electrode of an electrostatic capacitor $C_S$ is connected to a point at which the MIM device 13 and the pixel electrode 15 are connected, and another electrode of the electrostatic capacitor $C_S$ is connected to stable potential $V_S$.

6 Claims, 18 Drawing Sheets

LIQUID-CRYSTAL DISPLAY DEVICE

TECHNICAL FIELD

The present invention relates to liquid-crystal display devices, and in particular, to the structure of a liquid-crystal display device including an active device for each pixel.

BACKGROUND ART

There is a conventional liquid-crystal display device including one active device connected to an interconnection layer so as to correspond to each pixel. In this liquid-crystal display device a voltage is supplied to pixel electrodes via active devices based on the potential of the interconnection layer, whereby an electric field applied to a liquid crystal layer disposed between the pixel electrodes and a counter electrode is controlled, so that the display condition of the pixels is controlled.

In this case, when the liquid-crystal display device is a so-called active matrix type, the pixel electrodes are arranged in the form of a matrix, and a plurality of scanning lines and a plurality of signal lines positioned perpendicularly to the scanning lines independently control the display condition of each pixel region.

Three-terminal devices such as thin film transistors (TFTS) and two-terminal devices such as metal-insulator-metal (MIM) devices are known as the active devices.

In FIG. 12, the equivalent circuit of an active-matrix liquid-crystal device with a two-terminal device as an active device is shown.

MIM devices 13 as active devices are connected to a plurality of scanning lines 11 as an interconnection layer formed on the internal surface of a device substrate, and other terminals of the MIM devices 13 are connected to pixel electrodes 15. The pixel electrodes 15 are connected to a counter electrode formed on the internal surface of a counter substrate, with a liquid crystal layer 14 provided between them.

There are device capacitors $C_{MIM}$ in the MIM devices 13, which are connected in series to liquid-crystal capacitors $C_{LC}$ formed by the pixel electrodes 15, the counter electrode 16 and the liquid crystal layer 14 between them.

The MIM devices 13 are connected to the scanning lines 11. However, in reverse, there may be a case where the liquid crystal layer 14 is connected to the scanning lines 14.

In FIG. 13, a schematically perspective view of a structural example of a conventional active-matrix liquid-crystal display device is shown. In addition, in FIG. 14, a sectional view of an MIM device as one example of an active device is shown.

On the internal surface of one substrate 30A is formed a base layer 30a composed of, e.g., Ta oxide for enhancing the adhesion between the base and an interconnection layer formed thereon.

As shown in FIG. 14, on the base layer 30a is formed a first electrode portion 31a integrated with a scanning line 31 composed of, e.g., tantalum. On its surface an insulating film 33a composed of tantalum oxide is formed by using anodic oxidation. And, a second electrode portion 33b composed of, e.g., chromium is formed thereon.

The first electrode portion 31a, the insulating film 33a and the second electrode portion 33b constitute an MIM device 33.

In addition, as shown in FIG. 13, a pixel electrode 35 composed of, e.g., indium-tin-oxide (ITO) is formed to be connected to the second electrode portion 33b of the MIM device 33.

On the internal surface of another opposite substrate 30B, a counter electrode 36 composed of ITO is formed in the direction (the direction parallel to the sheet) intersecting the scanning line 31, and the counter electrode, the pixel electrode, and a liquid crystal layer provided between the substrates 30A and 30B constitute a pixel for display.

However, the liquid-crystal display device including the above conventional active device has a circuit arrangement in which the device capacitors $C_{MIM}$ and the liquid-crystal capacitors $C_{LC}$ are connected in series as shown in FIG. 12. Thus, when a potential is supplied from the scanning line 31, the device capacitor causes a decrease in the ratio $C_{LC}/(C_{MIM}+C_{LC})$ of a voltage applied to the device capacitor of the MIM device with respect to a voltage applied between the scanning line 31 and the counter electrode 36 (signal line 32). Accordingly, problems occurs in which sufficient writing may not be performed due to the insufficient setting of the switching ratio of the MIM device, and in which voltage applied to the liquid crystal layer decreases even during a charge-holding period with the MIM device cut off after writing.

The above problems can be solved by reducing the device capacitance of the MIM device if possible. Reducing the device capacitance requires, for example, a reduction in the device area. However, it is difficult in production to form the device smaller than the conventional one.

Accordingly, the present invention solves the above problems, and provides a novel structure for ensuring sufficient a writing operation without decreasing a voltage applied to liquid crystal by different means from a method for improving the device characteristics of an active device such as an MIM device.

DISCLOSURE OF INVENTION

In order to solve the foregoing problems, according to the present invention, there is provided a liquid-crystal display device including pixel electrodes connected via active devices to an interconnection layer formed on a first substrate, and performing display by applying an electric field to a liquid crystallayer provided between the pixel electrodes and a counter electrode formed on a second substrate, in which the potential of a point at which the active device and the pixel electrode are connected is electrically connected to predetermined potential via an electrostatic capacitor.

The predetermined potential is a potential without no large potential change in most of a period in which at least the active devices operate to perform the writing to the pixel electrodes, and the new writing after the termination of the writing is performed. It may have such change that it cannot affect the operation of the active devices and liquid crystal display via the static capacitors.

According to this means, the connection of the electrostatic capacitors connected to the predetermined potential causes a condition similar to a case in which the capacitance of the liquid-crystal capacitors connected in series to the active devices having predetermined device capacitance is increased. This increases the portion of the voltage applied to the active devices in cut-off condition. Thus, the switching ratio of the active devices can be increased, which enables secure writing to the pixel electrodes, and even in the termination of writing, a decrease in voltage caused by the device capacitance of the active devices can be suppressed, which reduces a decrease in the voltage applied to the liquid crystal layer.

The interconnection layer comprises scanning lines, and preferably, the predetermined potential is the potential of the scanning line being not selected, corresponding to a pixel to which the active device belongs.

According to this means, the predetermined potential connected to the electrostatic capacitors can be obtained from the scanning line for another pixel. Thus, the means can be structured without a new interconnection pattern for supplying the predetermined potential.

Also, the means is preferably structured such that the scanning lines are arranged in parallel to form a matrix display unit to be driven by sequentially selecting the scanning lines, and the predetermined potential is obtained from the scanning line for an adjacent pixel selected just before the scanning line corresponding to the pixel to which the active device belongs is selected.

According to this means, the predetermined potential is obtained from the scanning line for an adjacent pixel selected just before the scanning line belonging to the pixel is selected. Thus, the stable potential of the scanning line being not selected, and only electrical connection to the scanning line for the adjacent pixel is required, so that the connection can be easily established.

In addition, there is provided a liquid-crystal display device including pixel electrodes connected via active devices to an interconnection layer formed on a first substrate, and performing display by applying an electric field to a liquid crystal layer provided between the pixel electrodes and a counter electrode formed on a second substrate, in which an electrode layer formed so as to be supplied with predetermined potential is formed on the surface of the first substrate, and the pixel electrodes are formed above the electrode layer, with an insulating layer provided therebetween.

According to this means, the electrode layer to be supplied with the predetermined potential via the insulating layer is formed below the pixel electrodes. Thus, the connection potential of the pixel electrodes and the active devices is connected to the predetermined potential via the electrostatic capacitors. Therefore, this condition is similar to a case in which the capacitance of the liquid-crystal capacitors connected in series to the active devices having the predetermined device capacitance. This increases the portion of the voltage applied to the active devices in cut-off condition, which increases the switching ratio of the active devices, so that writing to the pixel electrodes can be securely performed. Moreover, even in the termination of writing, a decrease in voltage caused by the device capacitance of the active devices can be suppressed, and a decrease in the voltage applied to the liquid crystal layer can be reduced.

The electrode layer may be electrically connected to a constant-potential line connected to constant potential.

Also, preferably, a plurality of scanning lines forming the interconnection layer are arranged in parallel to form a matrix display unit to be driven by sequentially selecting the scanning lines, and the electrode layer is electrically connected to a scanning line for an adjacent pixel selected just before the scanning line corresponding to the pixel to which the active device belongs is selected.

In this case, more preferably, the electrode layer is a portion formed such that at least part of the scanning line connected to the adjacent pixel is extended below the pixel electrode.

According to this means, the electrostatic capacitor can be formed by only forming the scanning line for the adjacent pixel to be wide. Thus, the need for providing a new electrode portion is eliminated, which can minimize a change in the production process, and can facilitates production.

In addition, there is provided a liquid-crystal display device having a liquid crystal layer provided between a pair of substrates,
the liquid-crystal display device including:
a plurality of interconnection layers arranged on either substrate;
two-terminal active devices comprising: first conductors consisting of at least part of the interconnection layers, insulators disposed on the first conductors, and second conductors disposed on the insulators;
an interlayer insulating film covering the interconnection layers and being disposed so that at least part of the second conductors is exposed; and
pixel electrodes disposed on the interlayer insulating film and being electrically connected to the second conductors exposed on the interlayer insulating film,
in which the interconnection layers are arranged so that at least part of one interconnection layer overlaps two-dimensionally with the pixel electrode connected to the interconnection layer adjacent to the one interconnection layer, with the interlayer insulating film provided therebetween.

According to this means, the pixel electrodes and part of the interconnection layers are arranged so as to overlap two-dimensionally, whereby electrostatic capacitors connected in series to the active devices can be formed, and this condition is similar to a case in which the capacitance of the liquid-crystal capacitors connected in series to the active devices having the predetermine capacitance is increased. Accordingly, the portion of the voltage applied to the active devices is increased. Thus, the switching ratio of the active devices can be increased to enable secure writing to the pixel electrodes, and even in the termination of writing, a decrease in voltage caused by the device capacitance of the active devices can be suppressed, which can reduce a decrease in the voltage applied to the liquid crystal layer.

And, the predetermined potential connected to the electrostatic capacitors can be obtained from the interconnection layer for another pixel. Thus, the means can be structured without forming a new interconnection pattern for obtaining the predetermined potential.

Furthermore, there is provided a liquid-crystal display device having a liquid crystal layer provided between a pair of substrates,
the liquid-crystal display device including:
a plurality of interconnection layers arranged on either substrate;
a linear electrode layer provided with comb-teeth-shaped electrodes arranged among the interconnection layers adjacent to one another;
two-terminal active devices comprising: first conductors consisting of at least part of the interconnection layers, insulators disposed on the first conductors, and second conductors disposed on the insulators;
an interlayer insulating film covering the interconnection layers and the linear electrodes and being disposed so that at least part of the second conductors is exposed; and
pixel electrodes disposed on the interlayer insulating film and being electrically connected to the second conductors exposed on the interlayer insulating film,
in which the pixel electrodes are arranged so that at least part of the pixel electrodes overlaps two-dimensionally with the comb-teeth-shaped electrodes, with interlayer insulating film provided therebetween, and
the linear electrode layer is electrically connected to predetermined potential.

According to this means, the pixel electrodes and the comb-teeth-shaped electrodes of the linear are arranged so as to overlap two-dimensionally, whereby electrostatic capacitors connected in series to the active devices can be formed, and this condition is similar to a case in which the capacitance of the liquid-crystal capacitors connected in series to the active devices having the predetermine capacitance is increased. Accordingly, the portion of the voltage applied to the active devices is increased. Thus, the switching ratio of the active devices can be increased to enable secure writing to the pixel electrodes, and even in the termination of writing, a decrease in voltage caused by the device capacitance of the active devices can be suppressed, which can reduce a decrease in the voltage applied to the liquid crystal layer.

Preferably, the interconnection layer is disposed so as to overlap two-dimensionally with the gap between the pixel electrodes adjacent to each other.

In this case the region between the pixels can be used as a non-transmissive region for shielding light, and the display quality of the liquid-crystal display device can be improved.

BEST MODE FOR CARRYING OUT THE INVENTION

Embodiments according to the present invention will be described below with reference to the attached drawings.

(First Embodiment)

Figure 1:
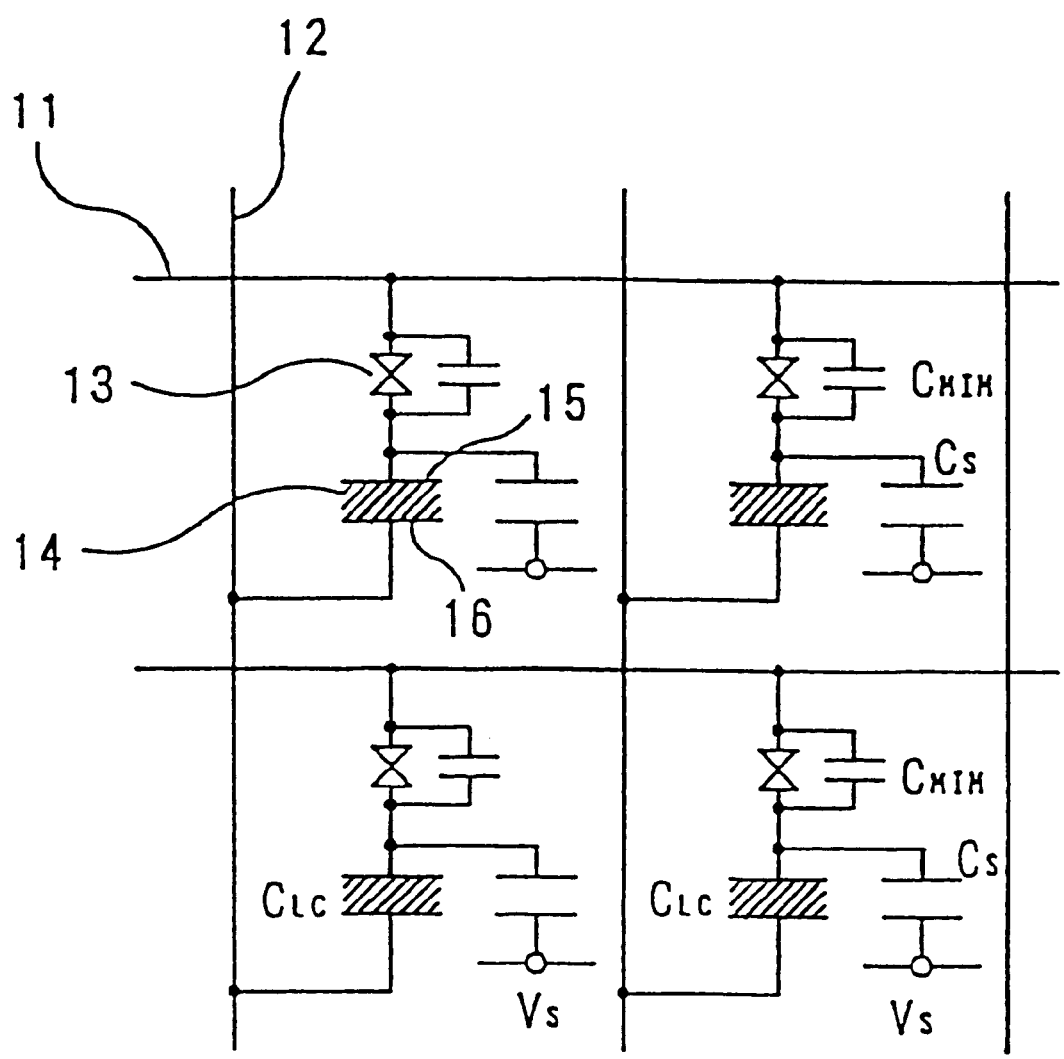
FIG. 1 is an equivalent circuit diagram showing a first embodiment of a liquid-crystal display device according to the present invention.

FIG. 1 shows the equivalent circuit of a first embodiment of a liquid-crystal display apparatus according to the present invention. MIM devices 13 are connected to scanning lines 11, and pixel electrodes 15 are connected to the MIM devices 13. In this embodiment, electrodes of capacitors $C_S$ are connected to the connections between the MIM devices 13 and the pixel electrodes 15, while other electrodes of the capacitors $C_S$ are connected to stable potential $V_S$.

Although the stable potential $V_S$ is fundamentally equal to the potential of a counter electrode opposed to the pixels, it is, in particular, preferably equal to the potential of the counter electrode opposed to the pixels. Also, the stable potential is preferably stabilized by the MIM devices 13 during most of a period for writing to the pixel electrodes and a period for holding the potential of the pixel electrodes, and the extent of the stability is sufficient such that the switching of the MIM devices 13 is not hindered and display by a liquid crystal layer 14 is not affected.

Figure 12:
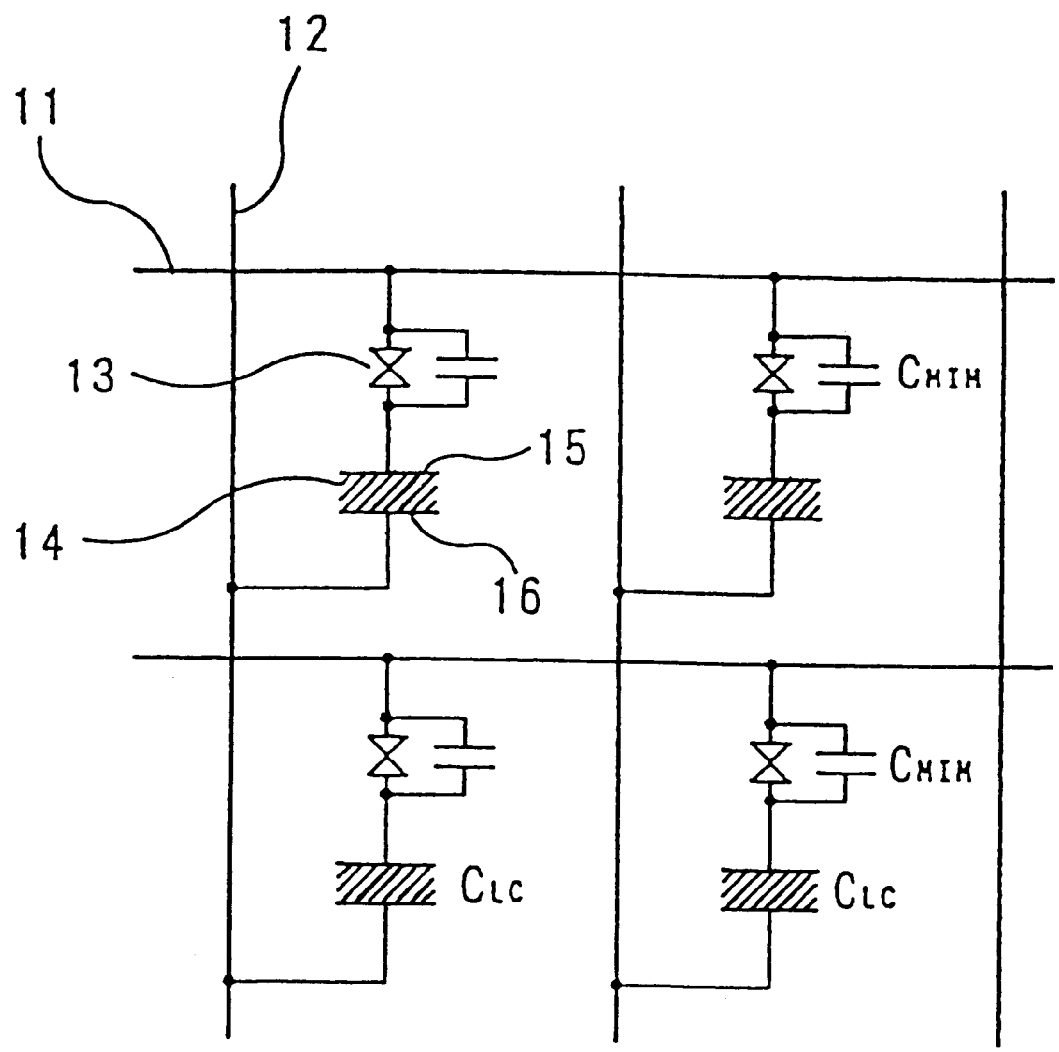
FIG. 12 is an equivalent circuit diagram of a conventional liquid-crystal display device.
Figure 13:
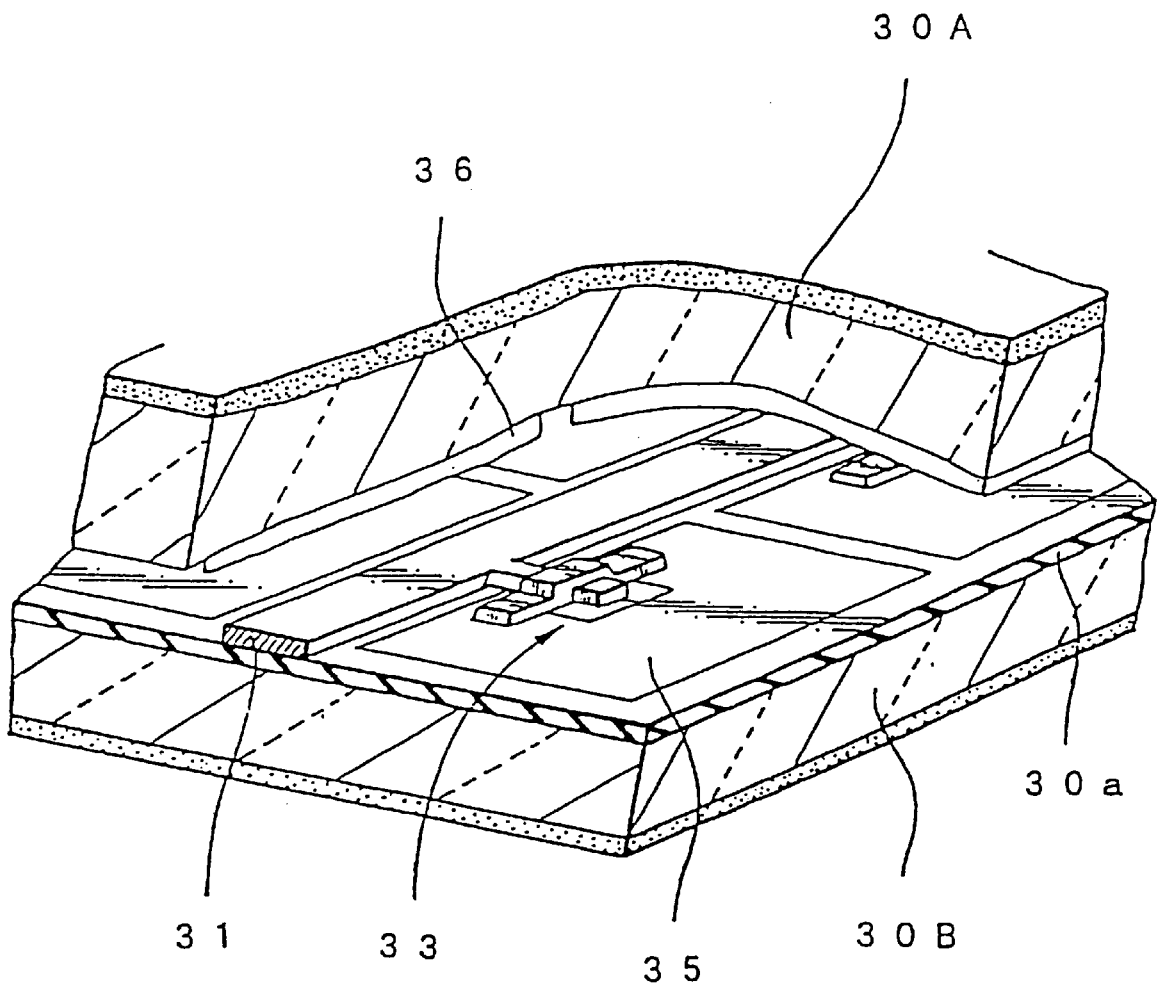
FIG. 13 is a perspective view showing the schematic structure of a conventional liquid-crystal display device.

The above provision of the capacitors $C_S$ causes the liquid-crystal capacitors $C_{LC}$ and the capacitors $C_S$ to be connected in parallel, judging from device capacitors $C_{MIM}$ in a circuit arrangement of the scanning lines 11 to which voltages are applied and signal lines. Thus, the ratio of a voltage applied to the device capacitor $C_{MIM}$ of the MIM device with respect to the voltage applied between the scanning lines 11 and the signal lines 12 is $(C_{LC}+C_S)/(C_{LC}+C_S+C_{MIM})$, which is greater than that in the conventional example shown in FIG. 12, so that the portion of the voltage applied to the MIM device increases.

Accordingly, when one scanning line 11 is selected, and high-potential pulses are applied to the input of the MIM device 13, the voltage applied to the MIM device 13 is greater than that in the conventional example even if the same pulse potential is used. Thus, the switching ratio can be set large, and sufficient writing (transfer of electric charges) can be performed.

In addition, even in a case where the termination of the period for selecting one scanning line 11 decreases the potential to cut off the MIM device 13, the addition of capacitor causes the relative capacitance of the device capacitor $C_{MIM}$ to decrease. Thus, the voltage ratio applied to the device capacitor increases to enlarge the potential difference between both ends of the MIM device cut off, so that a decrease in the voltage applied to the liquid crystal layer can be controlled and a high voltage can be maintained.

The stable potential $V_S$ can be supplied by providing onto the device substrate an additional interconnection connected to predetermined constant potential, and connecting the other electrode of the capacitor to the interconnection. In addition, it can be supplied by connecting the other electrode of the capacitor to a component having, to some extent, stable potential during most of the writing period and the charge-holding period. The greater the difference with the scanning potential is, the more preferable the stable potential $V_S$ is. In particular, when the stable potential $V_S$ is set close to the potential of the counter electrode 16 to the pixel, a condition in which the liquid-crystal capacitor $C_{LC}$ and the electrostatic capacitor $C_S$ are connected in parallel is almost established, and the condition is similar to the addition of the liquid-crystal capacitance by the electrostatic capacitance.

(Second Embodiment)

Figure 2:
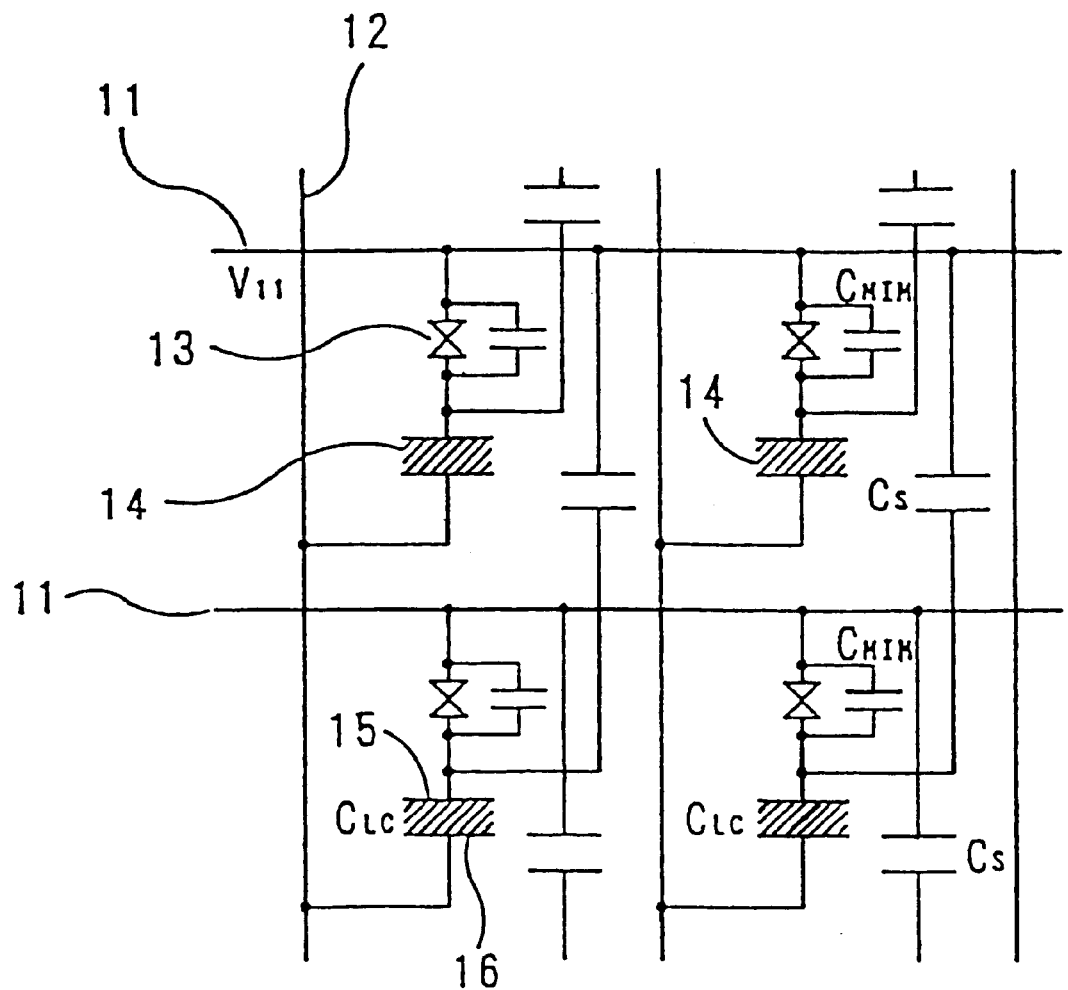
FIG. 2 is an equivalent circuit diagram showing a second embodiment of a liquid-crystal display device according to the present invention.

In FIG. 2, the equivalent circuit of a second embodiment according to the present invention is shown. According to this embodiment, in a pixel including an MIM device 13 connected to a scanning line 11, a liquid crystal layer 14, a pixel electrode 15 and a counter electrode 16, one electrode of an capacitor is connected to the connection between the MIM device 13 and the pixel electrode 15, and another electrode thereof is a scanning line 11 for an adjacent pixel, which is adjacent to the pixel and is selected before the pixel.

In this embodiment, stable potential connected to the capacitor is not a constant potential but is the potential of the scanning line 11 for the adjacent pixel. In a period (selection period) for writing to the pixel, the adjacent pixel enters a non-selection period, and the scanning line 11 corresponding thereto is approximately at the constant potential. In addition, during most of the subsequent holding period, the scanning line 11 is at the constant potential (the potential changes in only a period for selecting the adjacent pixel, set just before the selection period for selecting the pixel). Thus, there is almost no influence to the pixel, and the potential of the scanning line 11 for the adjacent pixel is regarded as substantially sufficient, stable potential.

Accordingly, this embodiment has advantages similar to those of the first embodiment. In addition, new stable potential does not need to be provided, and only connection to the scanning line for the adjacent pixel is required, so that the connection can be easily established.

(Third Embodiment)

Figure 3:
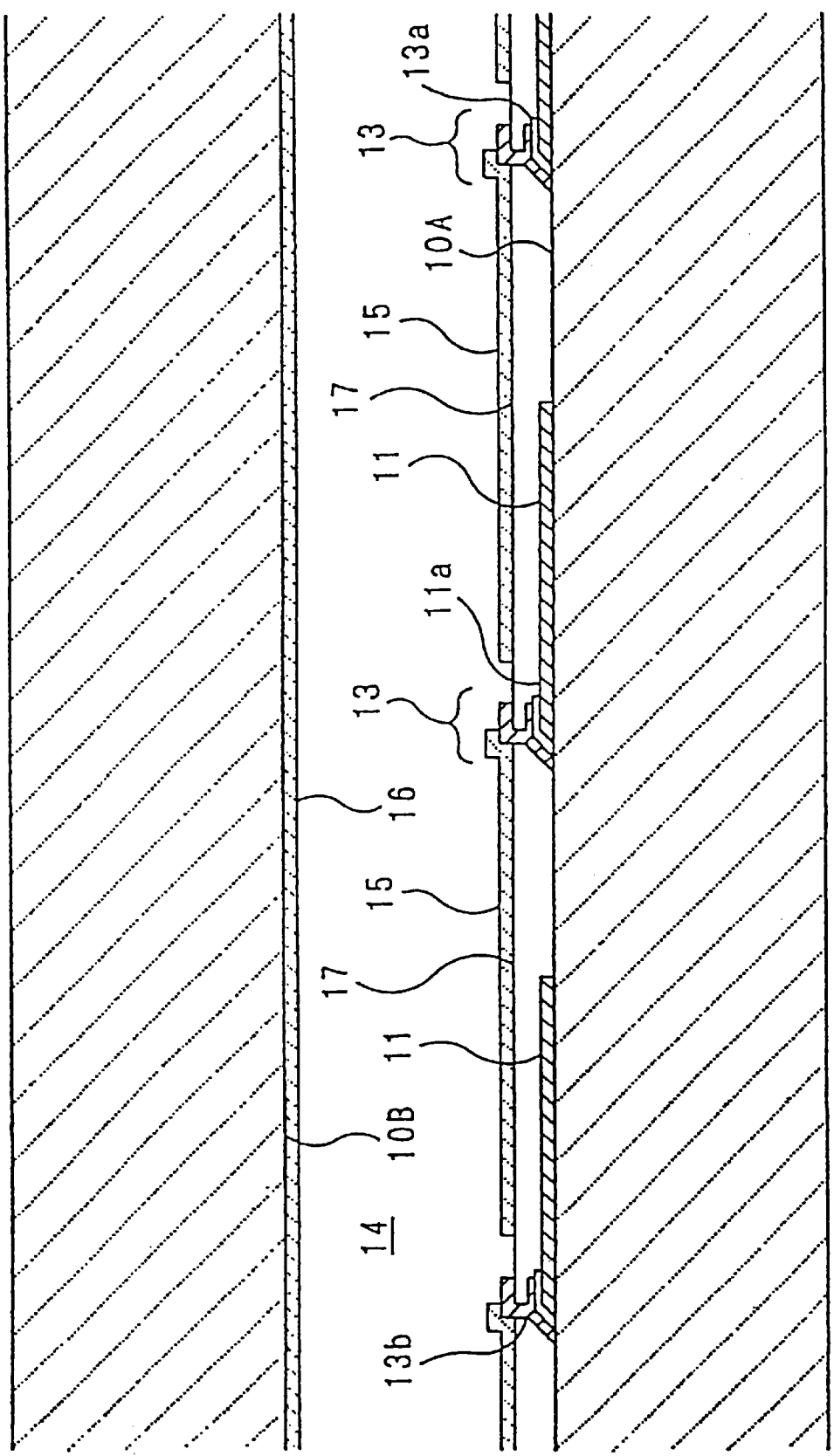
FIG. 3 is an equivalent circuit diagram showing a third embodiment of a liquid-crystal display device according to the present invention.
Figure 4:
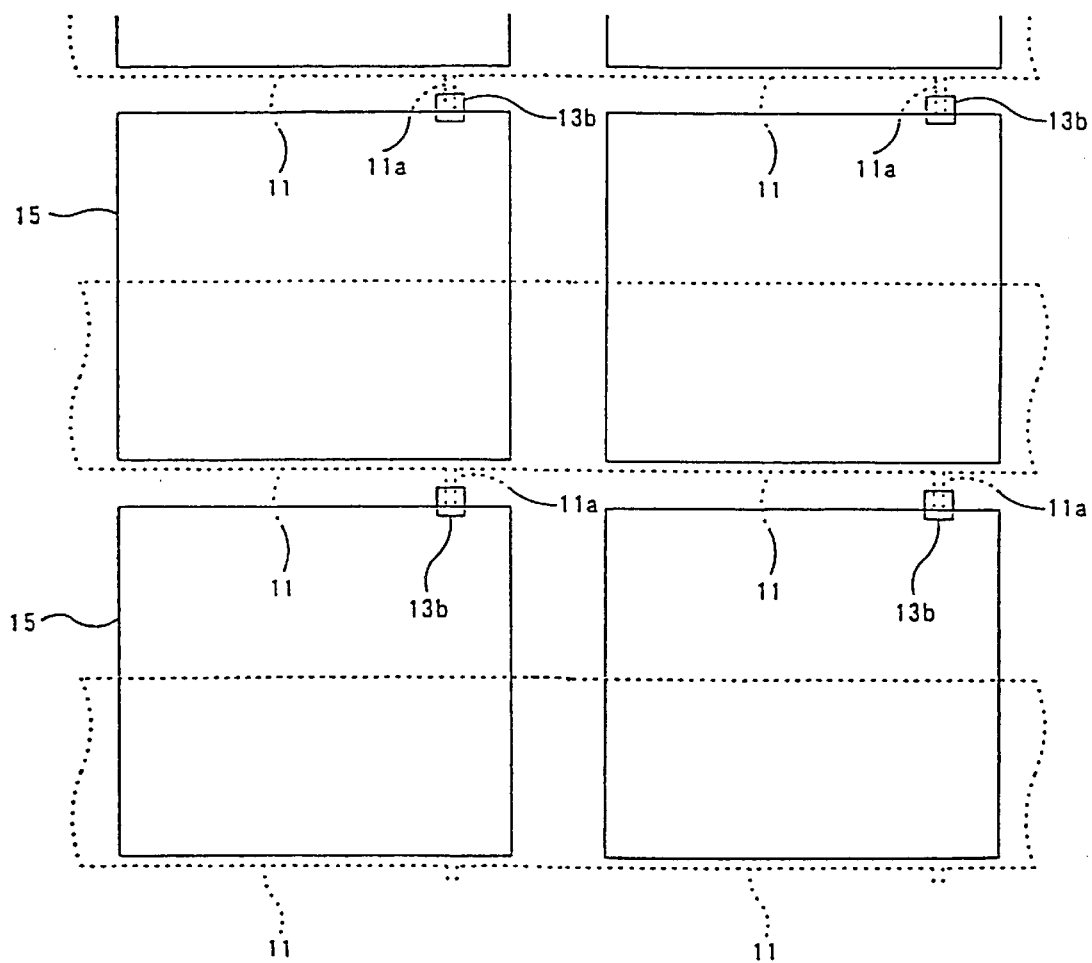
FIG. 4 is a plane view showing the structure of a device substrate in the above third embodiment.

FIG. 3 shows the sectional structure of a third embodiment of the liquid-crystal display device including an equivalent circuit similar to that in the second embodiment. FIG. 4 shows the plane structure of a device substrate 10A in the present embodiment. According to the present embodiment, a base layer (not shown) composed of tantalum oxide is formed on the inner surface of the device substrate 10A, and a plurality of scanning lines 11 as a tantalum interconnection layer are formed perpendicularly to the sheet, with first electrode portions 1a combined with the scanning lines 11. Insulating films 13a composed of tantalum oxide are formed on the surfaces of the first electrode portions 11a by using anodic oxidation, and second electrode portions 13b composed of, e.g., chromium are formed thereon. The second electrode portions 13b may be composed of others such as aluminum, titanium and molybdenum.

The first electrode portions 11a, the insulating films 13a and the second electrode portions 13b constitute two-terminal active devices having a conductor-insulator-conductor structure.

The scanning line 11 is formed wider than normal (approximately 5 to 20 Fm), and is disposed so that most of the width overlaps two-dimensionally with an adjacent pixel. The width of the scanning line can be formed within a scanningline pitch range of normally 50 to 200 Fm.

An interlayer insulating film 17 is formed on the scanning lines 11, and portions of the second electrode portions 13b are exposed from the surface of the interlayer insulating film 17. The interlayer insulating film 17 may be composed of $SiO_2$, $AlO_3$, $Ta_2O_5$, polyimide resin, acrylic resin, and so forth.

Pixel electrodes 15 are formed on the surfaces of the interlayer insulating films 17, and the peripheries of the pixel electrodes 15 are electrically connected to the exposed portions of the second electrode portions 13b, with both arranged to overlap.

A counter electrode 16 opposed to the pixel electrodes are formed on the internal surface of a counter substrate 10B, and display pixels are formed such that a liquid crystal layer 14 is provided between the counter electrode 16 and the pixel electrodes 15.

This embodiment is a reflective liquid-crystal display device. The counter electrode 16 is a transparent electrode made of a transparent conductor such as ITO, and the pixel electrodes 15 are also used as reflective electrodes and are formed with a metal such as chromium. When the second electrode portions 13b and the pixel electrodes are made of the same material, the patterning of both into a combined shape may be performed, which can delete part of a process for producing the active device.

Also, when reflective electrodes are disposed to the counter substrate 10B, it is allowed that the counter electrode 16 is formed with a metal such as Cr, otherwise a reflective layer is formed with Cr or the like, a transparent insulating film is formed thereon, and a transparent conductor is used thereon to form a counter electrode.

And, in this case, it is required that the scanning lines 11 and the pixel electrodes 15 be formed with transparent conductors such as ITO, and the interlayer insulating film 17 be a transparent insulating film such as $SiO_2$.

On the other hand, when the embodiment is a transmissive liquid-crystal display device, it is required that the counter electrode 16, the scanning lines 16 and the pixel electrodes 15 be formed with transparent conductors, and the interlayer insulating film 17 be composed of a transparent insulating film.

And, in this case, the second electrode portions 13b and the pixel electrodes 15 may be formed with transparent conductors such as ITO so as to combine together, so that part of the process for producing the active device can be deleted.

In the third embodiment, the first electrode portions 11a, the insulating films 13a and the second electrode portions 13b constitute MIM devices 13, and capacitors $C_S$ are formed by the overlapping portions of the wide scanning lines 11 and corresponding to the adjacent pixels, and the pixel electrodes 15 disposed with the interlayer insulating film 17 provided.

The capacitance of the capacitors can be easily determined, as widely known, by the areas of the overlapping portions of the scanning lines and the pixel electrodes, and the thickness of the interlayer insulating film.

This embodiment has advantages similar to those of the second embodiment. In addition, capacitors can be formed by using a simple pattern arrangement for only forming the wide scanning lines 11, and the formation of the wide scanning lines can further reduce the resistance of the scanning lines. Thus, this embodiment also has an advantage in which the capacitance load of the interconnection increased by the formation of the capacitors can be canceled.

(Fourth Embodiment)

Figure 5:
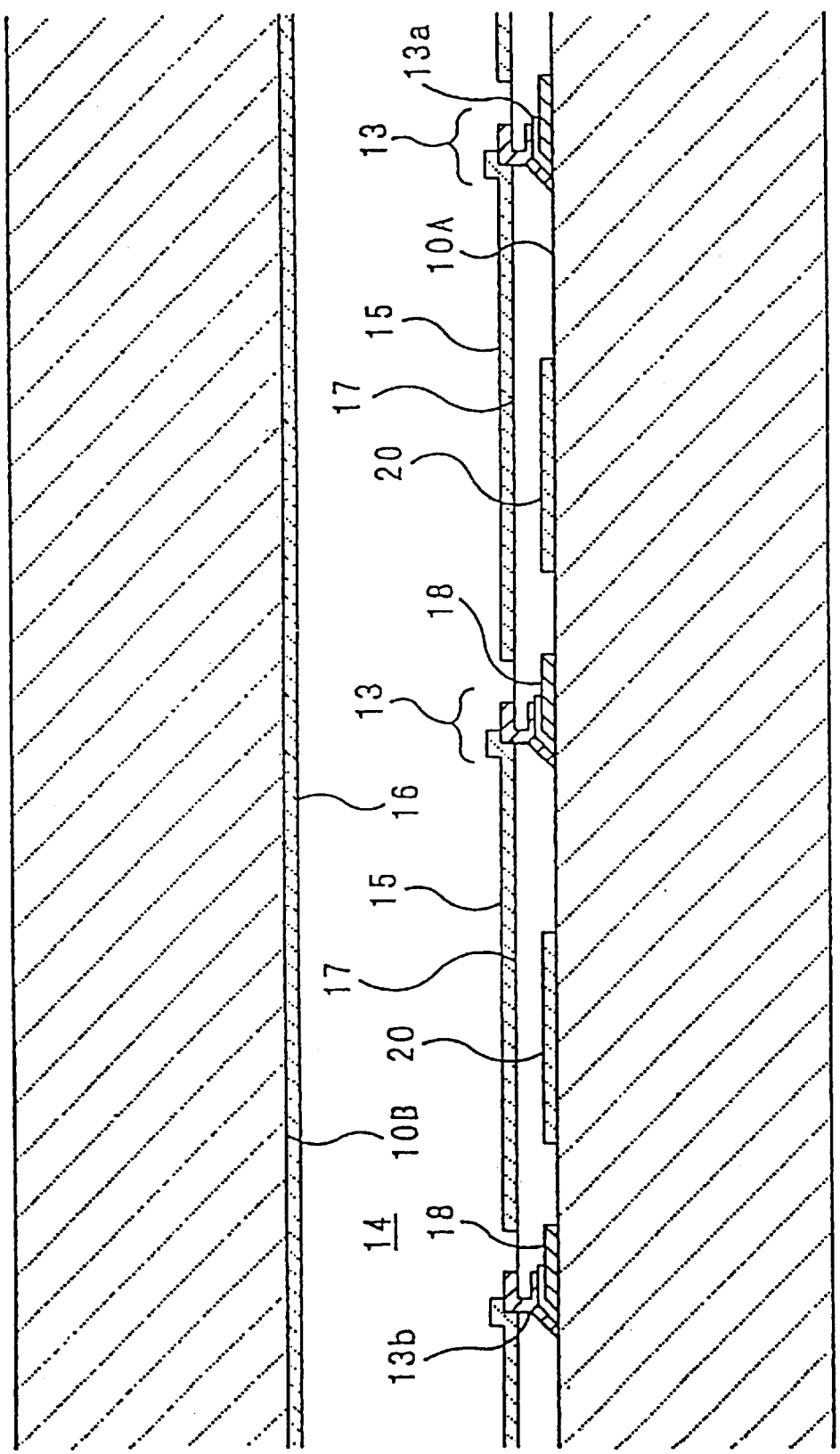
FIG. 5 is a longitudinal sectional view showing a fourth embodiment of a liquid-crystal display device according to the present invention.
Figure 6:
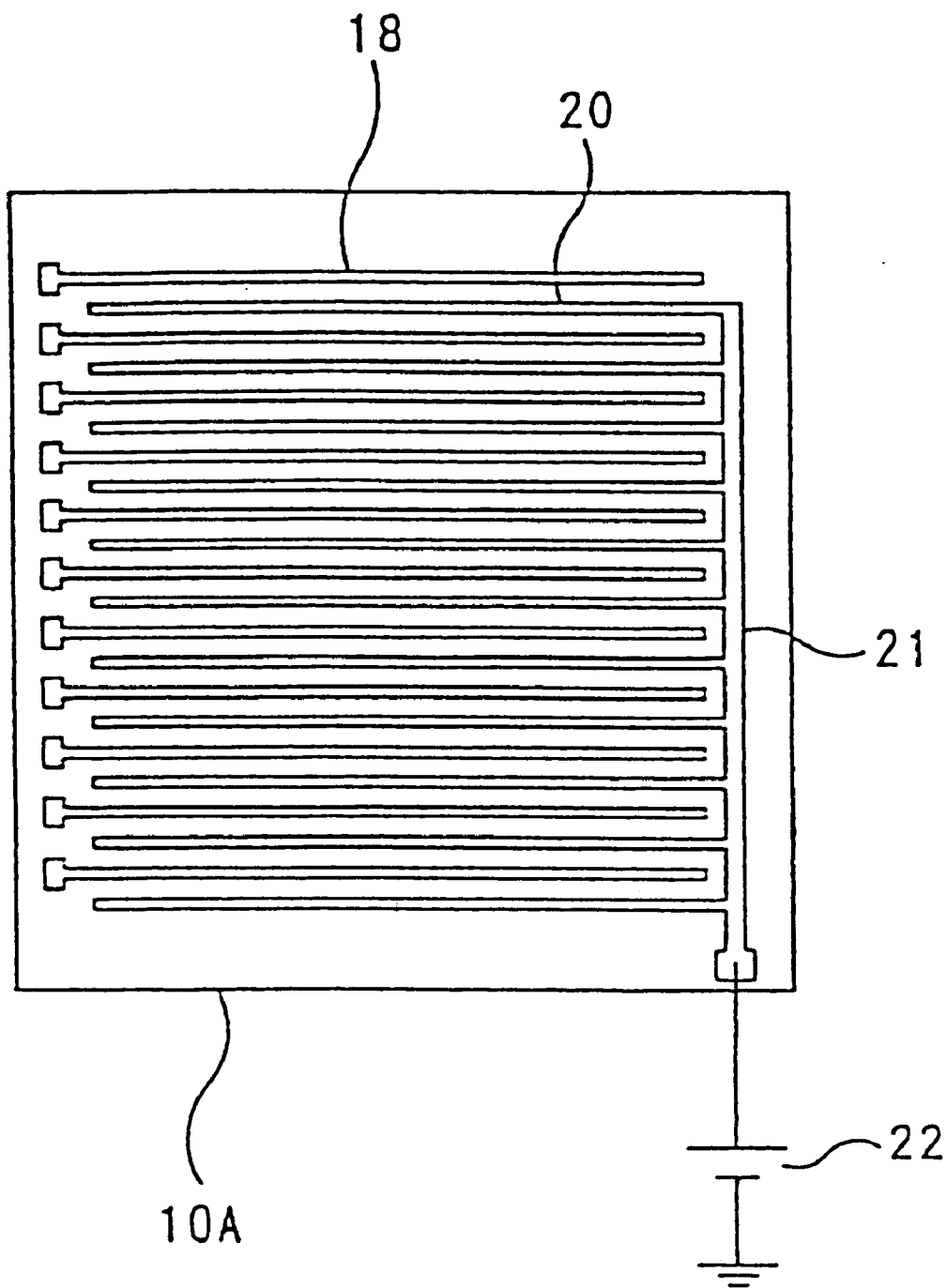
FIG. 6 is a schematic plan view showing an interconnection pattern on the device substrate in the fourth embodiment.

FIG. 5 shows a sectional structure according to a fourth embodiment. FIG. 6 shows a schematic interconnection pattern of scanning lines and potential supply lines formed on a device substrate 10A according to this embodiment.

According to this embodiment, scanning lines 18 are formed on the internal surface of the device substrate 10A, and insulating films 13a are formed on the surfaces of first electrodes formed to combine with the scanning lines 18. On the surfaces of the insulating films 13a are formed second electrode portions 13b.

Also, on the internal surface of the device substrate 10 A are formed linear electrodes 20, and on the linear electrodes 20 is formed an interlayer insulating film 17. Portions of the second electrode portions 13b are exposed from the surface of the interlayer insulating film 17, and the exposed portions are electrically connected to pixel electrodes 15. Similar to the third embodiment, also in this embodiment, a liquid crystal layer is encapsulated between the device substrate 10A and a counter substrate 10B provided with a counter electrode 16.

FIG. 6 shows a schematic plane pattern of the scanning lines 18 formed on the surface of the device substrate 10A and the linear electrodes 20. Since the plurality of formed linear electrodes 20 are connected to a common connection pattern 21, each line pattern can be supplied with a predetermined, constant potential by connecting to a power supply 22, a power-supply pad which is connected to the connection pattern and is formed at an end of the substrate.

In this embodiment, capacitors $C_S$ are formed by portions at which the pixel electrodes 15 and the linear electrodes 20 are opposed to overlap mutually with the interlayer insulating film 17 provided therebetween. When the pixel electrodes 15 comprise metal electrodes used also as a reflective layer, a reflective liquid-crystal display device can be structured.

Similar to the case of the third embodiment, a reflective layer may be formed onto the counter substrate 10B.

In addition, when the pixel electrodes 15 and the linear electrodes 20 comprise transparent electrodes, and the interlayer insulating film 17 comprises a transparent insulating film, a transmissive liquid-crystal display device can be structured.

When the transmissive liquid-crystal display device is structured, by arranging the scanning lines 18 to overlap the regions between the adjacent pixel electrodes, the regions between the pixel electrodes can be formed as non-transmissive regions (black regions) to improve recognition by sight.

Also in this embodiment, in order to form the interconnection layers, the mentioned materials concerning the third embodiment may be used.

Figure 7A:
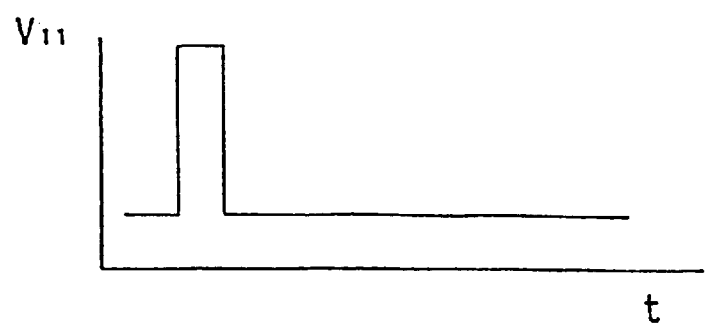
FIG. 7 consists of graphs (a) to (d) showing potentials and voltages in portions which illustrate the operations of the embodiments according to the present invention.

Next, the operations of the embodiments will be described with reference to FIG. 7. The above four embodiments have substantially similar effects and advantages. In FIGS. 7(a), (b), (c) and (d), the potential $V_{11}$ of a scanning line for an adjacent pixel, voltage $V_{MIM}$ applied to the MIM device 13, voltage VLC applied to the liquid crystal layer 14 are sequentially shown. Dotted lines shown in FIG. 7(c) and FIG. 7(d) represent waveforms in the conventional liquid-crystal display device shown in FIG. 12.

FIG. 7(a) shows the potential of the scanning line for the adjacent pixel being paid attention to before being selected one time. For the pixel paid attention to, it can be used as stable potential to be connected to the capacitor.

Figure 7B:
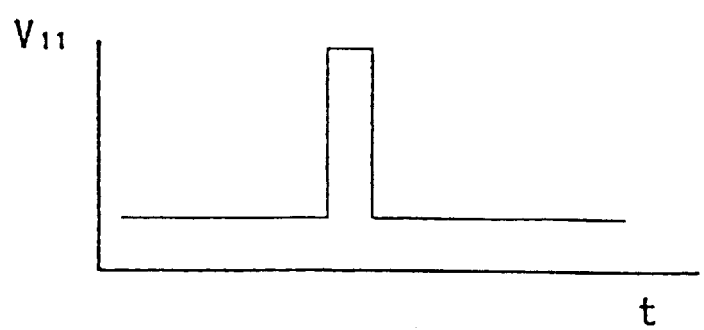
Figure 7C:
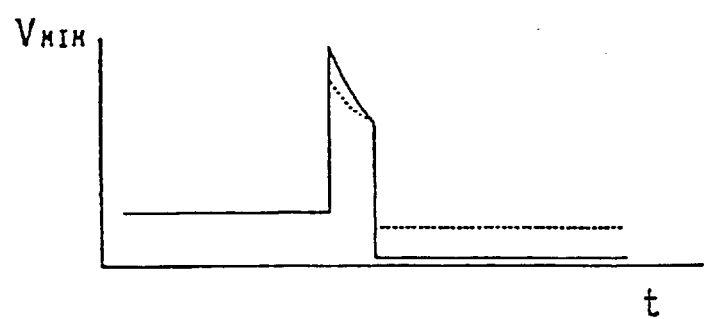
Figure 7D:
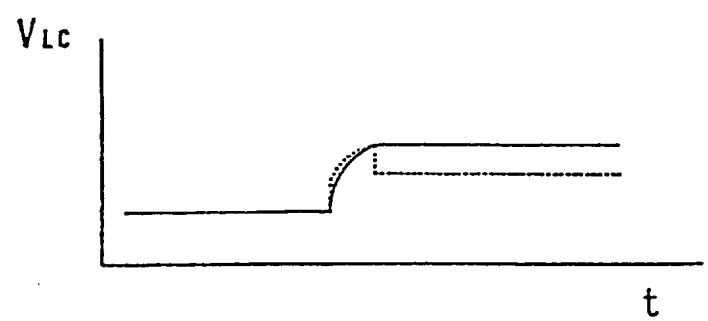

When one scanning line 11 is selected and a high potential is applied thereto as shown in FIG. 7(b), the voltage $V_{MIM}$ applied to the MIM device 13 immediately rises as shown in FIG. 7(c). At this time, conventionally, the sufficient voltage is not applied to the MIM device 13 depending on the capacitance of the MIM device 13. However, according to the above embodiments, connecting the capacitor increases the voltage applied to the MIM device 13 more than the conventional voltage, and the increased voltage causes the MIM device 13 to be switched on (in conduction). Accordingly, at the same scanning-line potential, the above embodiments have the voltage is more applied to the MIM device, which thus enables the substantially large switching ratio of the device and secure writing to each pixel.

In addition, when writing to the pixel terminates and the potential of the scanning line 11 decreases to cut off the MIM device 13, it is considered that the MIM device capacitance appears in the circuit. Conventionally, the relationship between the device capacitance of the MIM device and the liquid-crystal capacitance of the liquid crystal layer causes the applied voltage to be distributed to the MIM device and the liquid crystal layer, and the transfer of electric charge slightly reduces the voltage applied to the liquid crystal layer as represented by the dotted line shown in FIG. 7(d). According to the above embodiments, adding the capacitor relatively increases the amount of the electric charge stored in the liquid-crystal capacitor and the electrostatic capacitor even if the electric charge transfers. Thus, a change in the voltage applied to the liquid crystal layer is minute. In particular, when the electrostatic capacitor is connected to the same potential as the counter electrode, an effect similar to that in which the liquid-crystal capacitance increases by the electrostatic capacitance.

Next, a specific example of a method for driving the active devices will be described.

The above embodiments, which have been described, applies to a method for driving two-terminal active devices, a four-value driving method using a two-value selection voltage and a two-value data voltage, and a driving-by-charging method which drives active devices by mixing the first mode of supplying a scanning line with a first selection voltage and the second mode of supplying a second selection voltage to the scanning line after supplying a pre-charge voltage thereto.

Figure 8:
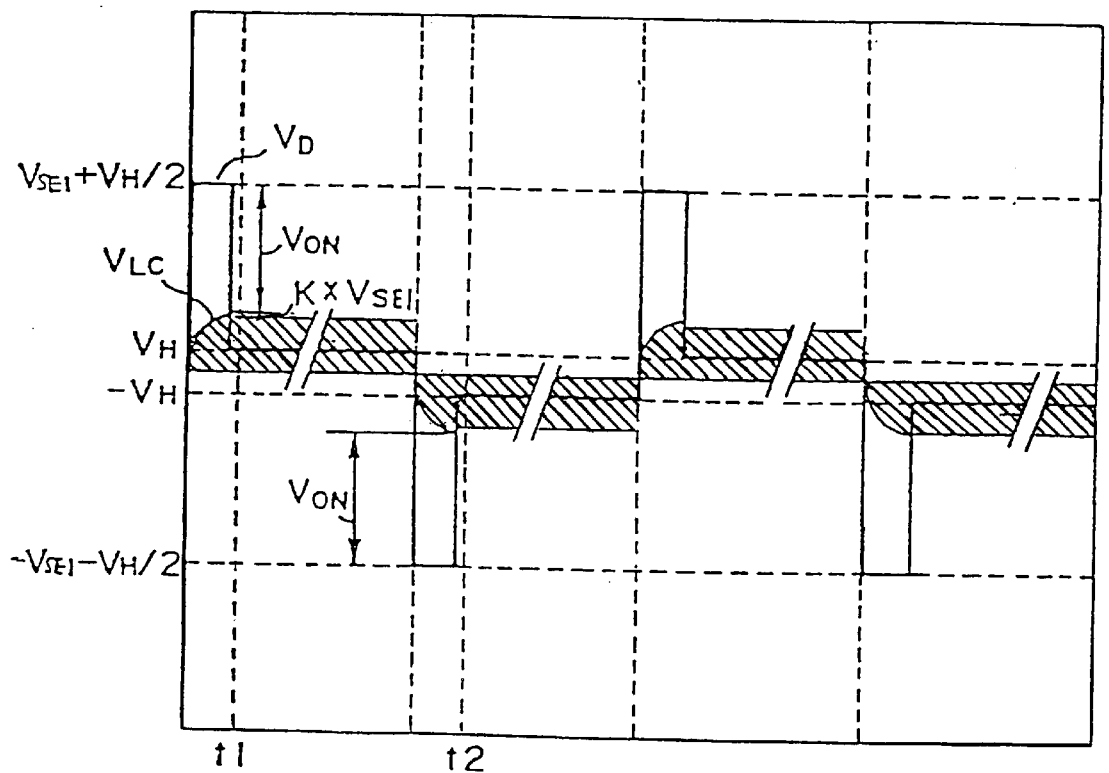
FIG. 8 is a chart showing an example of a driving waveform in a four-value driving method.
Figure 9:
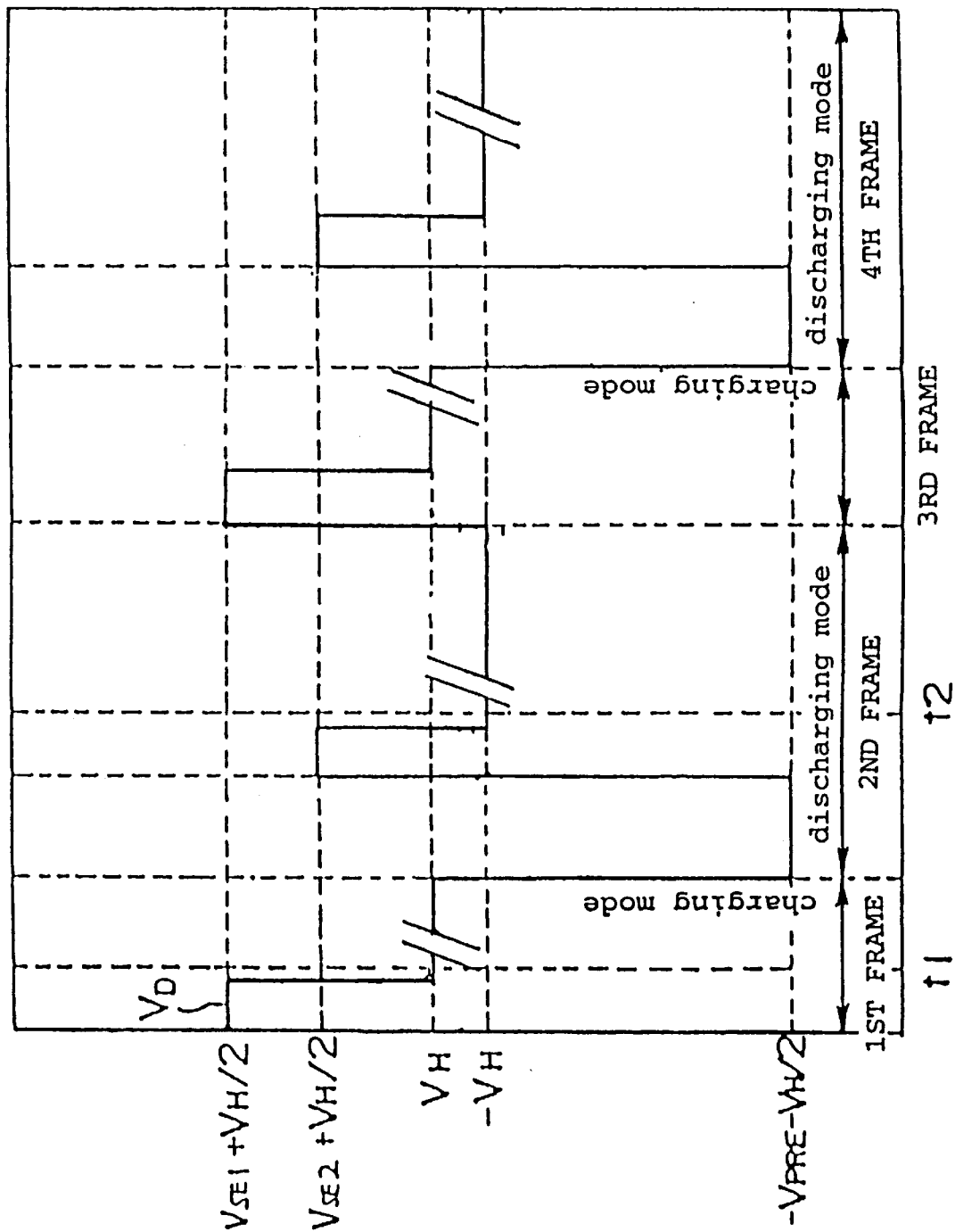
FIG. 9 is a chart showing an example of a driving waveform in a charging/discharging driving method.

In FIG. 8, an example of a driving waveform in the four-value driving method is shown, and in FIG. 9, an example of a driving waveform in the driving-by-charging method is shown. FIG. 8 and FIG. 9 show the waveform of voltage VD applied to the ends of an MIM device and a liquid crystal layer (hereinafter referred to as a "liquid crystal device"), and the waveform of voltage $V_{LC}$ applied to the ends of the liquid crystal device.

According to the four-value driving method in FIG. 8, voltages $V_{A1}$, $V_{A2}$ ($V_{LC}$ are times t1, t2) applied to the liquid crystal device just after the termination of the selection period are as follows:

$$V_{A1}=(V_{SE1}+V_H/2-V_{ON})-K^*V_{SE1} \tag{1}$$

$$V_{A2}=-\{(V_{SE1}+V_H/2-V_{ON})-K^*V_{SE1}\} \tag{2}$$

where $V_{SE1}$ is the selection voltage of a scanning signal, "$V_H/2$ is the on voltage or off voltage of a data signal, and $K=C_{MIM}/(C_{MIM}+C_{LC}+C_S)$ In addition, $V_{ON}$ is $V_{MIM}$ applied to the MIM device just before the termination of the selection period, and the value is dependent on the current-voltage characteristics of the MIM device. It can also be said that the $V_{ON}$ is a voltage applied to the MIM device when the charging of the liquid crystal device almost terminates (when the current flows in the MIM device at approximately $10^{-9}$ to $10^{-8}$).

According to the present invention, the K decreases. Thus, as mentioned above, a change in the voltage applied to the liquid crystal device can be suppressed to a minute value.

In addition, according to the driving-by-charging method, as shown in FIG. 9, in charging mode (for example, first mode), first selection voltage $V_{SE1}$ is supplied to the scanning line, and in discharging mode (for example, second mode), after pre-charge voltage $-V_{PRE}$ whose polarity is reverse to that of $V_{SE1}$ is supplied, second selection voltage $V_{SE2}$ whose polarity is reverse to that of $-V_{PRE}$.

And, voltage $V_{B1}$ ($V_{LC}$ at time t1, not shown) applied to the liquid crystal device just after the termination of the selection mode in charging mode is similar to that in the equation (1), and the following equation is established:

$$V_{B1}=(V_{SE1}+V_H/2-V_{ON})-K^*V_{SE1} \quad (3)$$

In discharging mode, after overcharging by pre-charge voltage $-V_{PRE}$, second selection voltage $V_{SE2}$ causes the charge stored by charging to be discharged, and voltage applied to the liquid crystal device just before the selection period is $V_{SE2}+V_H/2-V_{ON}$. Therefore, voltage $V_{B2}$ ($V_{LC}$ at time t2, not shown) applied to the liquid crystal device just after the termination of the selection period is as follows:

$$V_{B2}=-\{(V_{ON}-V_{SE2}-V_H/2)+K^*(V_{SE2}+V_H)\} \quad (4)$$

As is obvious from the equations (3) and (4), when $V_{ON}$ increases by, for example, delta $V_{ON}$, the absolute value of $V_{B1}$ decreases by delta $V_{ON}$, or the absolute value of $V_{B2}$ reversely increases by delta $V_{ON}$, while when $V_{ON}$ decreases by delta $V_{ON}$, the absolute value of $V_{B1}$ increases by delta $V_{ON}$, or the absolute value of delta $V_{B2}$ reversely decreases by delta $V_{ON}$.

In this manner, according to the driving-by-charging method, even if $V_{ON}$ of the MIM device changes due to a shift in the device characteristics of the device substrate, an error voltage occurring in the voltage applied to the liquid crystal in charging mode is canceled in its effective voltage by an error voltage occurring in the voltage applied to the liquid crystal in discharging mode.

Figure 10:
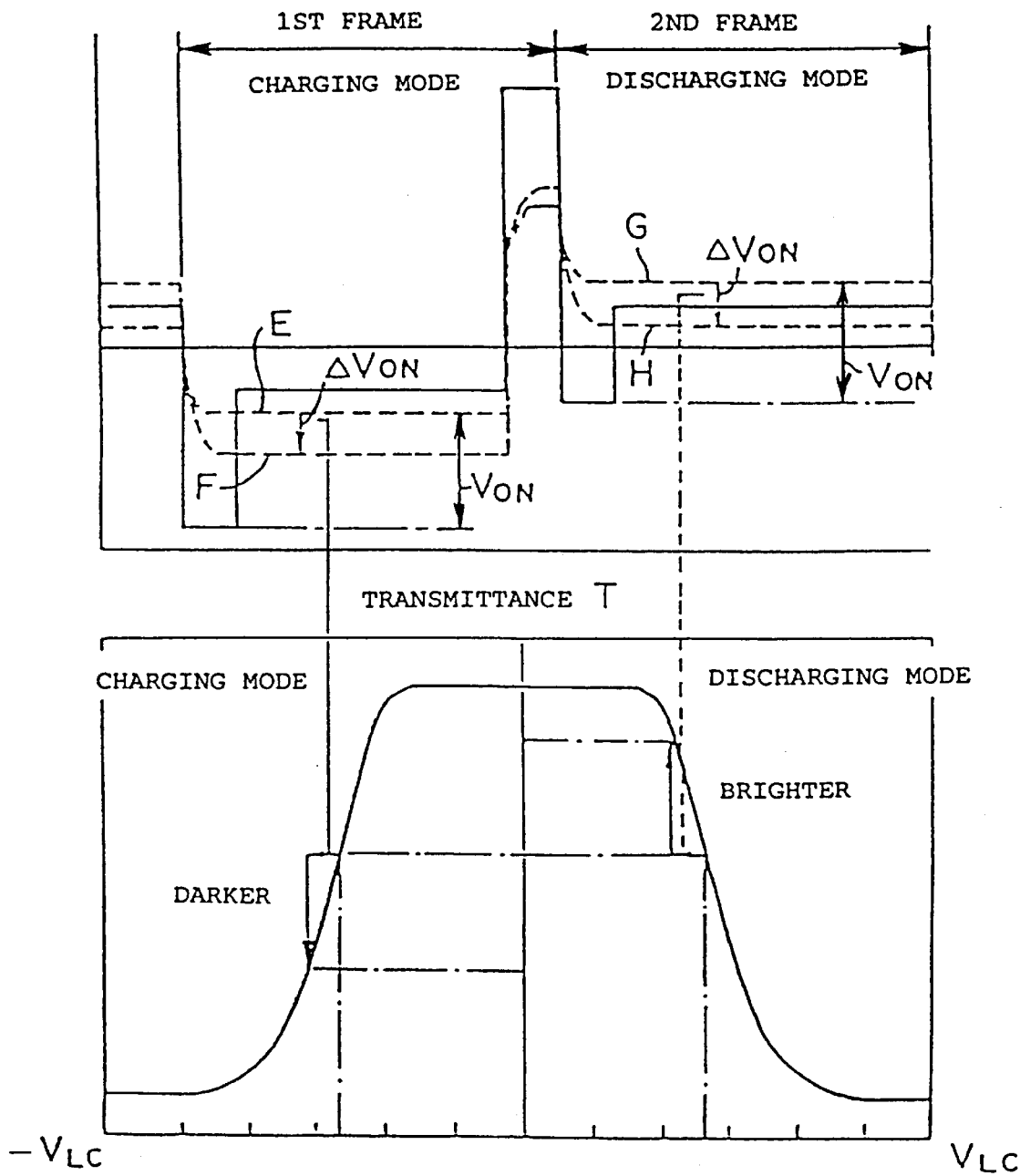
FIG. 10 consists of charts illustrating the improvement of display characteristics.

Accordingly, when there is a shift in $V_{ON}$ of the MIM device in the liquid-crystal display device, the occurrence of irregular display can be effectively prevented. In FIG. 10, what has been described is schematically shown. Error delta $V_{ON}$ occurs in $V_{ON}$, and in charging mode the absolute value of the voltage applied to the liquid crystal increases from E to F in FIG. 10, so that the effective voltage applied to the liquid crystal device also increases. This reduces the transmittance of the liquid crystal device to darken display (in the normally white case).

However, at this time, in discharging mode the absolute value of the voltage applied to the liquid crystal decreases from G to H in FIG. 10, and the effective voltage applied to the liquid crystal device decreases. This increases the transmittance of the liquid crystal device to brighten display. As a result, almost no change occurs in the total display brightness of one pixel. Accordingly, even if there is a shift in $V_{ON}$ of the MIM device in the liquid crystal panel, almost no change occurs in the display brightness, which thus prevents irregular display and so forth.

Figure 11A:
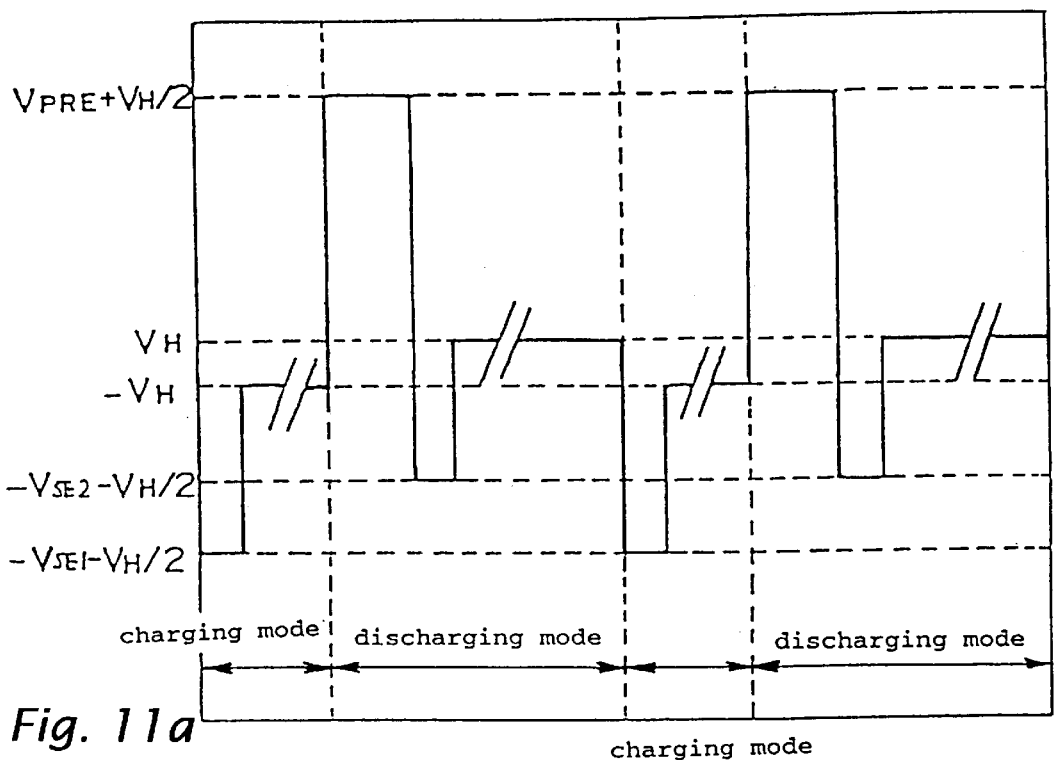
FIG. 11 consists of charts showing other examples of the driving waveform in the charging/discharging driving method.
Figure 11B:
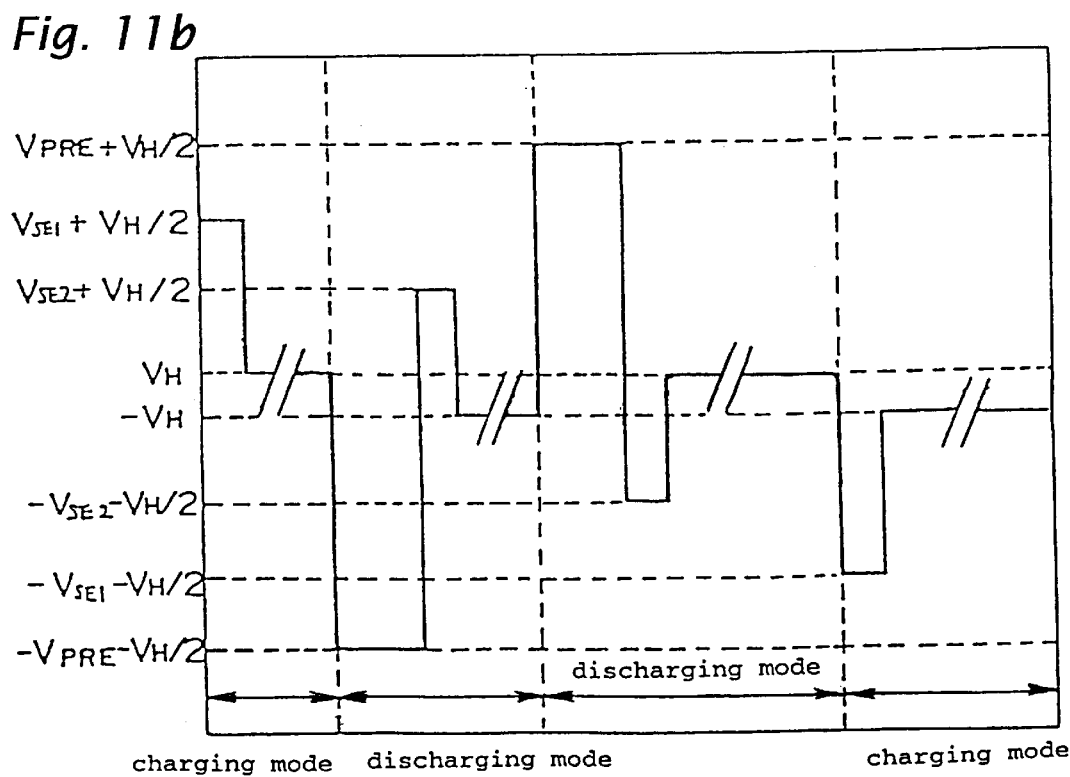

The driving waveform caused by the driving-by-charging method is not limited to one shown in FIG. 9. Instead, one including both charging mode and discharging mode may be used. For example, as shown in FIG. 10 and FIG. 11(A), positive pre-charging can be performed, and as shown in FIG. 11(B), positive and negative charging can be performed. In addition, the period for supplying the first, second selection voltage, or the pre-charge may be set to ½ of a horizontal scanning period 1H, and gradation display may be performed with the pulse height-modulation or the pulse-width modulation. Not only the driving by 1 H-inversion driving (driving by performing polarity inversion for one scanning line) but also one by nH inversion driving (driving by performing polarity inversion for each set of n scanning lines) may be used, and only the frame inversion driving may be used without performing 1H inversion driving.

The above embodiments of the present invention have been described by focusing attention on an MIM device as an active device. However, they are not limited thereto. A two-terminal device having a conductor-insulator-conductor structure may be used.

Next, an embodiment in which the above-described liquid-crystal display device is applied to an electronic apparatus is shown below.

Figure 15:
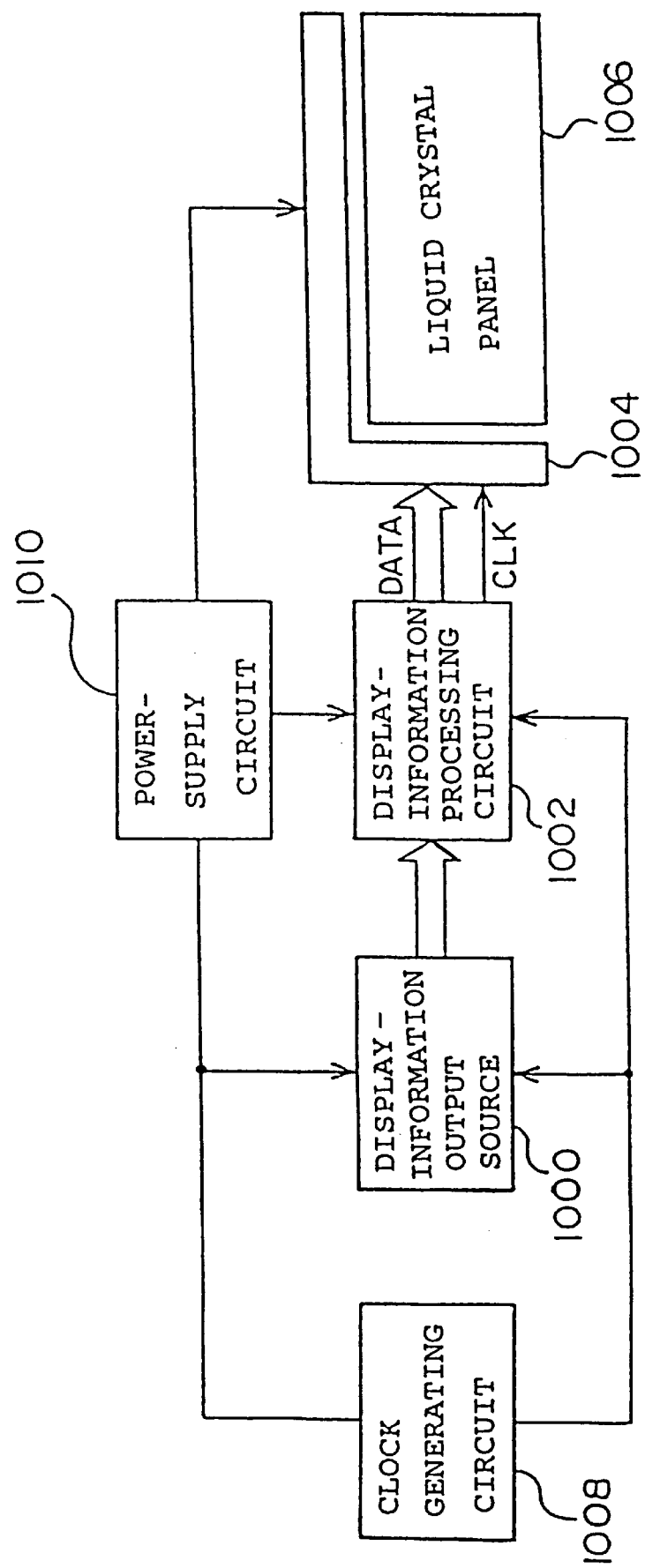
FIG. 15 is a diagram showing a structural example of an electronic apparatus.

An electronic apparatus formed by using the liquid-crystal display device according to the embodiment includes, as shown in FIG. 15, a display-information output source 1000, a display-information processing circuit 1002, a display driving circuit 1004, a display panel 1006 such as a liquid-crystal display device, a clock generating circuit 1008 and a power-supply circuit 1010. The display-information output source 1000 includes a memory such as a ROM and a ROM, and a tuning circuit for outputting a television signal by tuning, and outputs display information such as video signals, based on a clock from the clock generating circuit 1008. The display-information processing circuit 1002 processes the display information, based on the clock from the clock generating circuit 1008, and outputs it. The display-information processing circuit 1002 can include, for example, an amplification/polarity-inversion circuit, a phase expansion circuit, a rotation circuit, a gamma compensation circuit or a clamp circuit. The display driving circuit 1004 includes a scanning-side driving circuit and a data-side driving circuit, and drives the liquid-crystal display device 1006 to perform displaying. The power-supply circuit 1010 supplies power to each of the above circuits.

Figure 16:
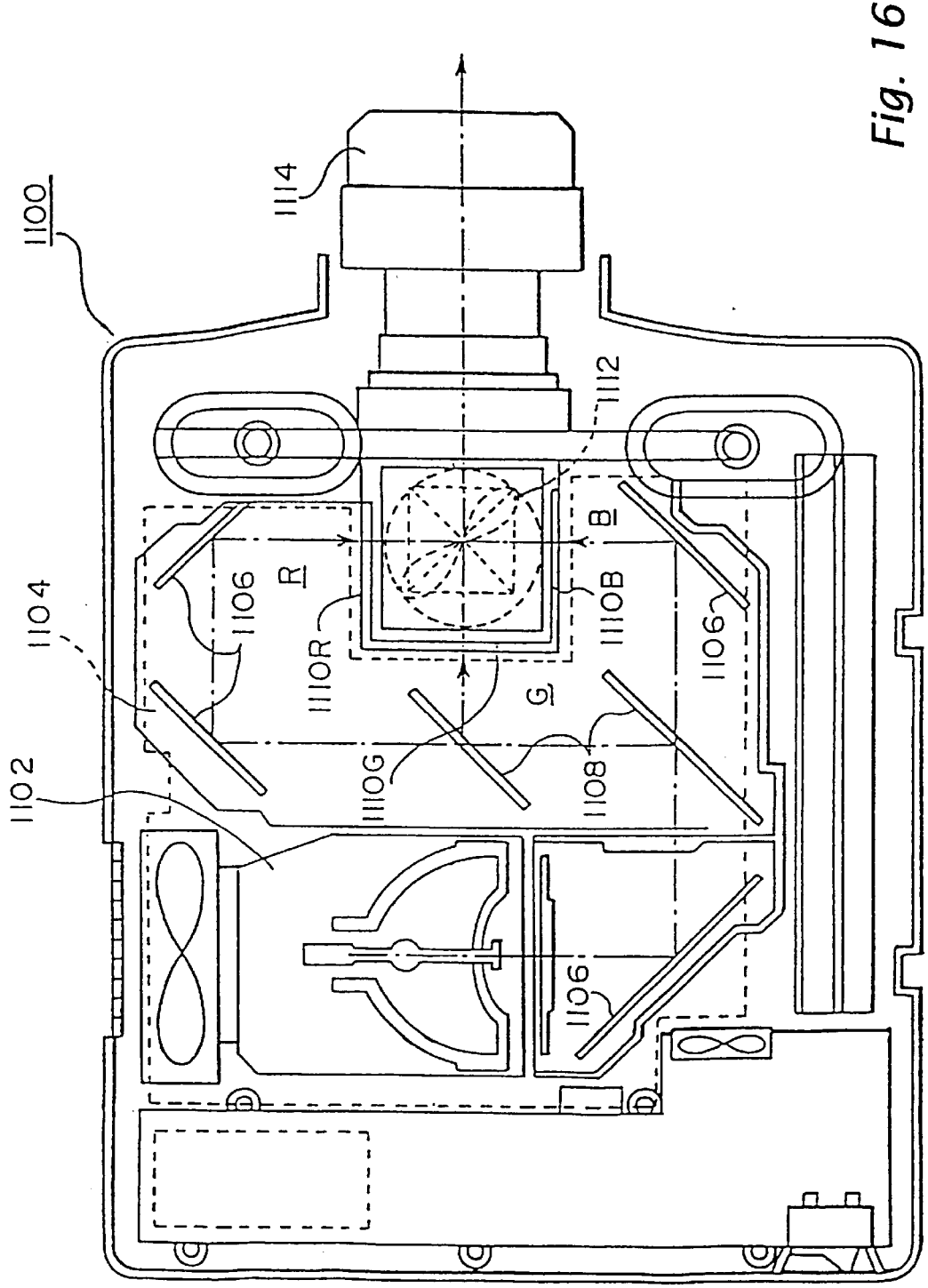
FIG. 16 is a chart showing an example of a projector as one of electronic apparatuses.
Figure 17:
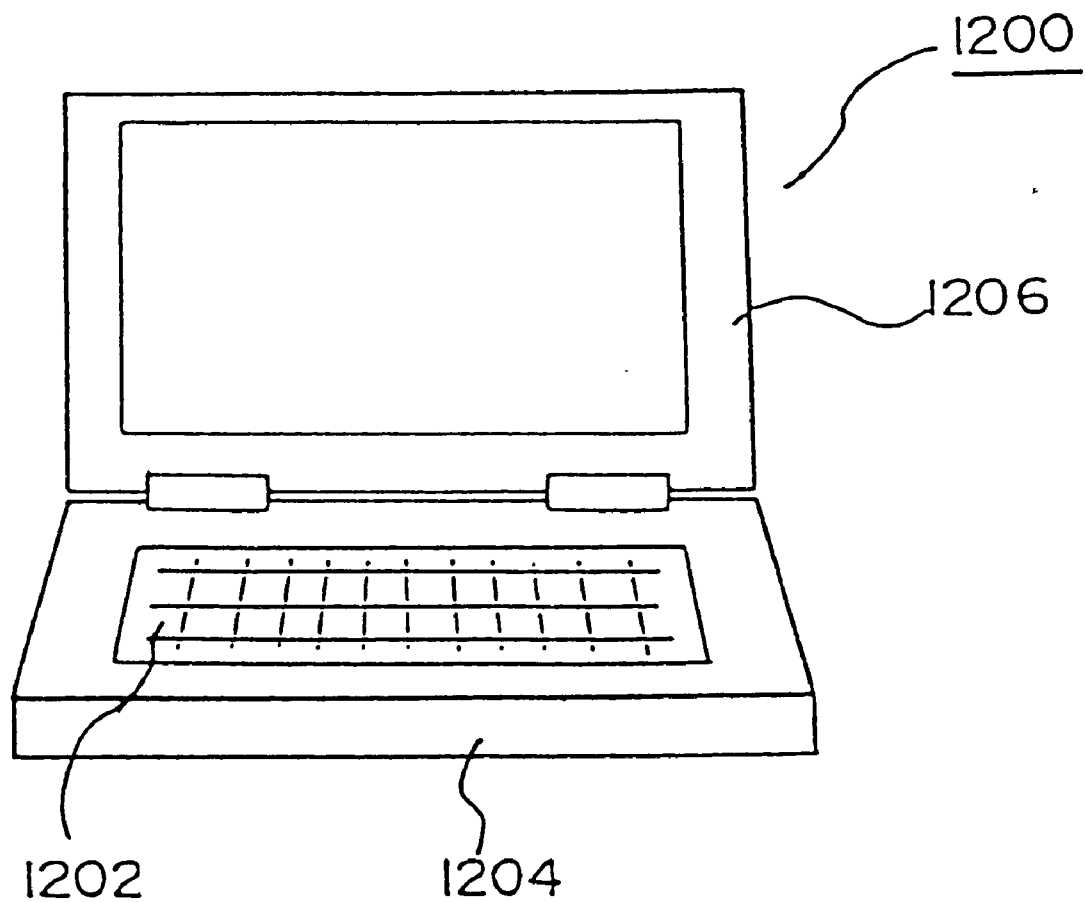
FIG. 17 is a chart showing an example of a personal computer as one of electronic apparatuses.
Figure 18:
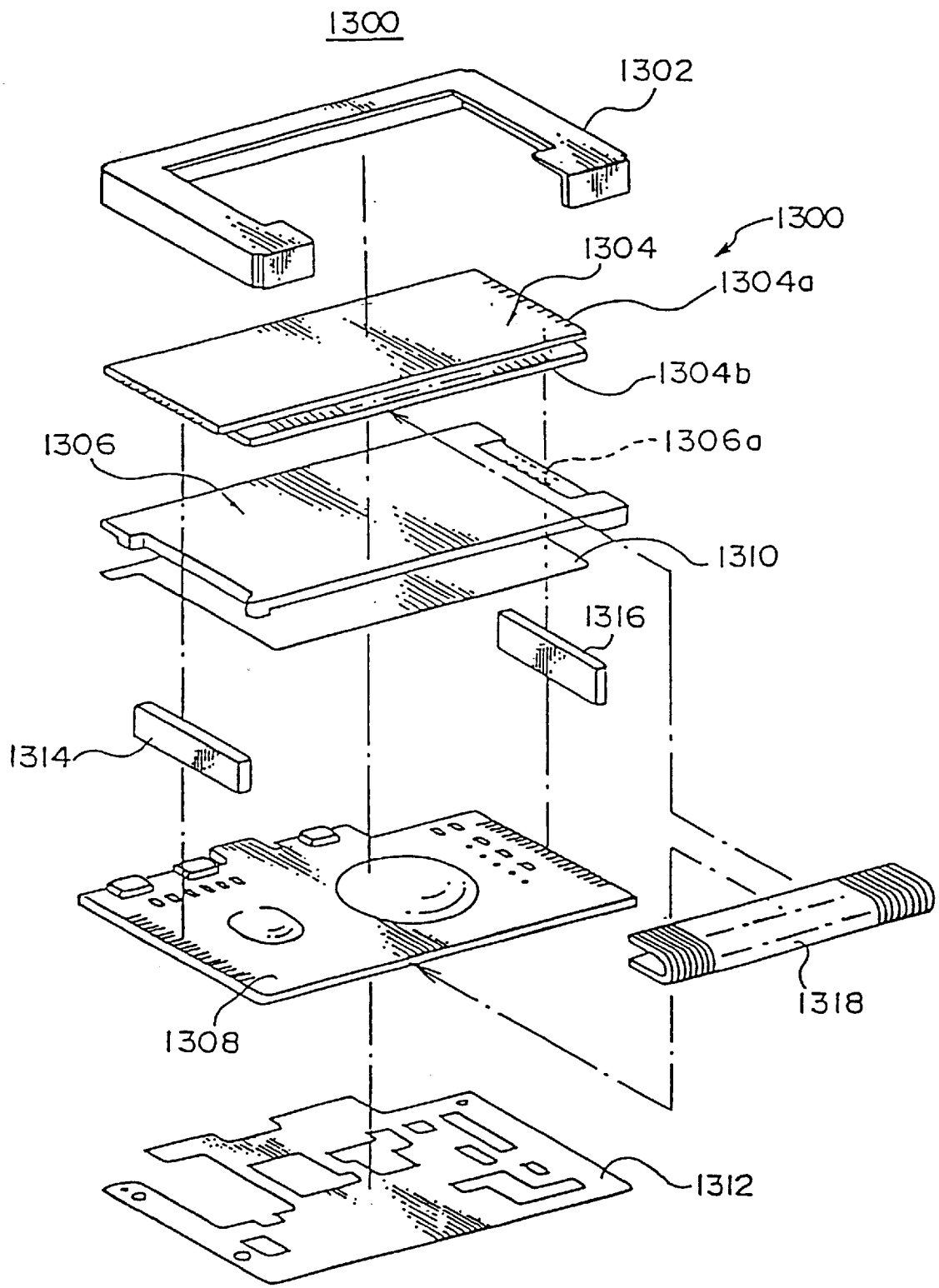
FIG. 18 is a chart showing an example of a pager as one of electronic apparatuses.

Electronic apparatuses having the above structure includes a liquid crystal projector shown in FIG. 16, a personal computer (PC) for multimedia shown in FIG. 17, an engineering work station (EWS), a pager shown in FIG. 18, a mobile telephone, a word processor, a television set, a view-finder or monitor-direct-vision video-tape recorder, an electronic pocketbook, an electronic desk calculator, a car navigation apparatus, a POS terminal, an apparatus provided with a touch panel.

The liquid crystal projector shown in FIG. 16 is a projection-type projector with a transmissive liquid-crystal display device as a light bulb, and uses, for example, a three-plate prism optical system.

In FIG. 16, according to the projector 1100, in a light guide 1104, projection light emitted from a white-light-source lamp unit 1102 is separated by a plurality of mirrors 1106 and two dichroic mirrors 1108 into three primary colors: R, G and B, which are guided to three liquid-crystal display devices 1110R, 1110G and 1110B for displaying the respective colors. The lights modulated by the liquid-crystal display devices 1110R, 1110G and 1110B are incident upon a dichroic prism 1112 from three directions. In the dichroic prism 1112, the red R and blue B lights are bent by 90/, and the green G light travels straight, so that the respective color images are combined and projected onto a screen or the like through a projection lens 1114.

The personal computer 1200 shown in FIG. 17 includes a body unit 1204 provided with a key board 1202, and a liquid-crystal display screen 1206.

The pager 1300 shown in FIG. 18 includes a liquid-crystal display substrate 1304, a light guide 1306 provided with a backlight 1306a, a circuit substrate 1308, first and second shields 1310, 1312, two elastic conductors 1314, 1316, and a film carrier tape 1318 in a metallic frame 1302. The two elastic conductors 1314, 1316, and the film carrier tape 1318 connect the liquid-crystal display substrate 1304 and the circuit substrate 1308.

Figure 14:
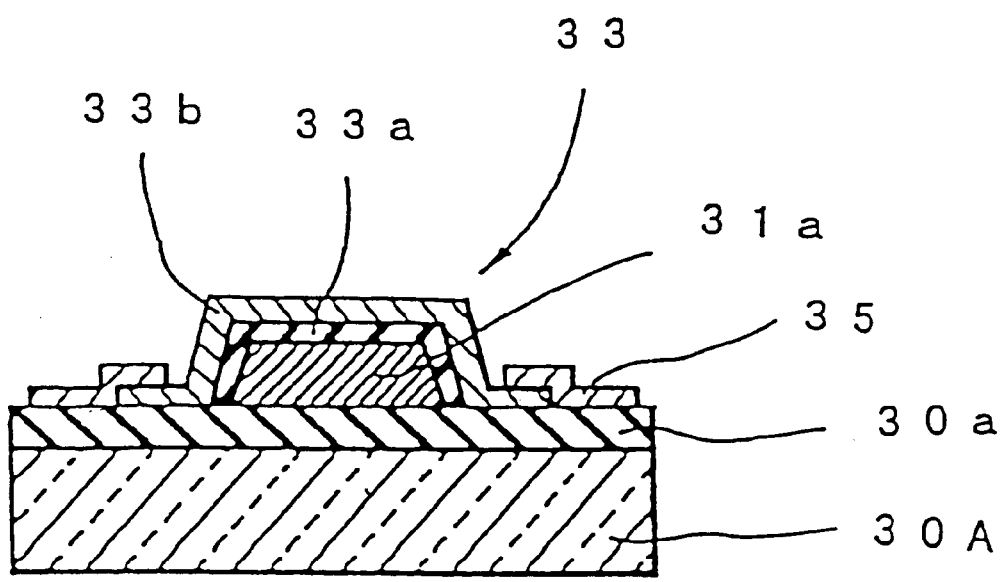
FIG. 14 is a sectional view showing a conventional active device.

The liquid-crystal display substrate 1304 has liquid crystal encapsulated between two transparent substrates 1304a and 1304b, and constitutes at least a dot-matrix liquid-crystal display device. The display driving circuit 1004 shown in FIG. 11, or the display-information processing circuit 1002 in addition thereto can be formed on one transparent substrate. A circuit which is not mounted on the liquid-crystal display substrate 1304 is an external circuit from the liquid-crystal display substrate. One in FIG. 14 can be mounted on the circuit substrate 1308.

Since FIG. 18 shows the structure of the pager, the circuit substrate 1308 is necessary other than the liquid-crystal display substrate 1304. However,when a liquid-crystal display device is used as one component for electronic equipment, and the display driving circuit and so forth are mounted on the transparent substrate, the minimum unit of the liquid-crystal display device is the liquid-crystal display substrate 1304. Otherwise, the metallic frame 1302 as a casing with the liquid-crystal display substrate 1304 fixed can be used as a liquid-crystal display device as one component for electronic equipment. In addition, for a backlight type, by incorporating the liquid-crystal display substrate 1304, and the light guide 1306 provided with the backlight 1306a into the metallic frame 1302, a liquid-crystal display device can be structured. Instead of these, as shown in FIG. 15, by connecting to either of the two transparent substrates 1304a and 1304b, a tape carrier package (TCP) 1320 in which an IC chip is mounted on a polyimide tape 1322 having a metallic conductive film formed thereon, the one with the TCP connected can be used as a liquid-crystal display device as one component for electronic equipment.

The foregoing electronic apparatuses have been described by referring to examples using a transmissive liquid-crystal display device. However, a reflective liquid-crystal display device can be used, and since this case does not use a backlight, unit-thickness reduction and consumption-power reduction can be performed in, for example, a personal computer and a pager.

What is claimed is:

1. A liquid-crystal display device having a liquid crystal layer provided between a pair of substrates, said liquid-crystal display device including:
a plurality of interconnection layers arranged on either substrate;
two-terminal active devices comprising: first conductors consisting of at least part of said interconnection layers, insulators disposed on said first conductors, and second conductors disposed on said insulators;
an interlayer insulating film covering said interconnection layers and being disposed so that at least part of said second conductors is exposed; and
pixel electrodes disposed on said interlayer insulating film and being electrically connected to said second conductors exposed on said interlayer insulating film,
in which said interconnection layers are arranged so that at least part of one interconnection layer overlaps two-dimensionally with said pixel electrode connected to said interconnection layer adjacent to the one interconnection layer, with said interlayer insulating film provided therebetween.

2. A liquid-crystal display device having a liquid crystal layer provided between a pair of substrates, said liquid-crystal display device including:
a plurality of interconnection layers arranged on either substrate;
a linear electrode layer provided with comb-teeth-shaped electrodes arranged among said interconnection layers adjacent to one another;
two-terminal active devices comprising: first conductors consisting of at least part of said interconnection layers, insulators disposed on said first conductors, and second conductors disposed on said insulators;
an interlayer insulating film covering said interconnection layers and said linear electrodes and being disposed so that at least part of said second conductors is exposed; and
pixel electrodes disposed on said interlayer insulating film and being electrically connected to said second conductors exposed on said interlayer insulating film,
in which said pixel electrodes are arranged so that at least part of said pixel electrodes overlaps two-dimensionally with said comb-teeth-shaped electrodes, with interlayer insulating film provided therebetween, and
said linear electrode layer is electrically connected to predetermined potential.

3. A liquid-crystal display device according to claim 2, wherein said interconnection layer is disposed so as to overlap two-dimensionally with a gap between said pixel electrodes adjacent to each other.

4. A liquid-crystal display device comprising:

pixel electrodes connected via active devices to an interconnection layer formed on a first substrate wherein said interconnection layer further comprises scanning lines, said scanning lines being arranged in parallel to form a matrix display unit to be driven by sequentially selecting said scanning lines; and an electrostatic capacitor connected at one end to a junction, between said active device and said pixel electrode and at the other end to one scanning line for obtaining predetermined potential of an adjacent pixel selected just before the scanning line corresponding to the pixel to which said active device belongs is selected, said liquid crystal display device performing display by applying an electric field to a liquid crystal layer provided between said pixel electrodes and a counter electrode formed on a second substrate.

5. A liquid-crystal display device comprising:

pixel electrodes connected via active devices to an interconnection layer formed on a first substrate;

a plurality of scanning lines forming said interconnection layer being arranged in parallel to form a matrix display unit to be driven by sequentially selecting said scanning lines; and an electrode layer formed on said first substrate wherein said pixel electrodes are formed above said electrode layer with an insulating layer provided therebetween, said electrode layer being electrically connected to the scanning line of an adjacent pixel that is selected just before the scanning line corresponding to the pixel to which said active device belongs is selected, the liquid crystal device performing display by applying an electric field to a liquid crystal layer provided between said pixel electrodes and a counter electrode formed on a second substrate.

6. A liquid-crystal display device according to claim 5, wherein said electrode layer is a portion formed such that at least part of the scanning line connected to said adjacent pixel is extended below said pixel electrode.

* * * * *

UNITED STATES PATENT AND TRADEMARK OFFICE
CERTIFICATE OF CORRECTION

PATENT NO.    : 6,201,584 B1
DATED         : March 13, 2001
INVENTOR(S)   : Tomio Sonehara et al.

It is certified that error appears in the above-identified patent and that said Letters Patent is hereby corrected as shown below:

Title page,
Item [56] References Cited; IDS filed 01/16/98 insert the following art cited under FOREIGN PATENT DOCUMENTS:

-- 64-73324  03/27/89  Japan
   1-144022  06/06/89  Japan
   1-197722  08/09/89  Japan
   2-922     01/05/90  Japan
   4-225330  08/14/92  Japan
   5-19302   01/29/93  Japan --

Column 1,
Line 25, "(TFTS)" should be -- (TFTs) --.

Column 2,
Line 16, "occurs" should be -- occur --.
Line 29, delete "a".
Line 40, "crystallayer" should be -- crystal layer --.

Column 3,
Line 66, "facilitates" should be -- facilitate --.

Column 4,
Line 28, "predetermine" should be -- predetermined --.

Column 5,
Line 7, "predetermine" should be -- predetermined --.

Column 7,
Line 9, "an" should be -- a --.
Line 40, "1a" should be -- 11a --.
Line 41, "13acomposed" should be -- 13a composed --.
Line 56, "scanningline" should be -- scanning line --.

Column 8,
Line 27, "16" should be -- 11 --.

UNITED STATES PATENT AND TRADEMARK OFFICE
CERTIFICATE OF CORRECTION

PATENT NO. : 6,201,584 B1
DATED : March 13, 2001
INVENTOR(S) : Tomio Sonehara et al.

It is certified that error appears in the above-identified patent and that said Letters Patent is hereby corrected as shown below:

Column 9,
Line 44, "VLC" should be -- $V_{LC}$ --.
Line 63, after "voltage" insert -- which --.

Column 10,
Line 47, ""$V_H/2$" should be -- $V_H/2$ --.
Line 48, after "$C_s$)" insert a period.

Column 12,
Line 13, (second occurrence) "ROM" should be -- RAM --.
Line 50, "90/" should be -- 90° --.

Column 13,
Line 25, after "chip" insert -- 1324 --.

Signed and Sealed this

Fifth Day of March, 2002

Attest:

JAMES E. ROGAN
*Attesting Officer*   *Director of the United States Patent and Trademark Office*